(12) United States Patent
Liang

(10) Patent No.: US 6,863,400 B1
(45) Date of Patent: Mar. 8, 2005

(54) TILED PROJECTION DISPLAY USING SPATIAL LIGHT MODULATORS

(75) Inventor: Rongguang Liang, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/761,507

(22) Filed: Jan. 21, 2004

(51) Int. Cl.$^7$ .................... G03B 21/00; G03B 21/26; G02F 1/00; G02F 1/1335; G02B 27/14
(52) U.S. Cl. ................... 353/20; 353/33; 353/34; 353/37; 353/81; 353/94; 353/99; 348/751; 348/757; 359/636; 349/9; 349/25
(58) Field of Search ................... 353/20, 30, 31, 353/34, 94, 33, 37, 81, 99; 359/224, 247, 263, 291, 293, 318, 501, 855, 636, 638, 618; 348/383, 742, 743, 744, 745, 750, 751, 764, 770, 771, 757, 758, 759; 349/5, 8, 9, 25, 28, 73, 74, 122; 345/30, 55, 108

(56) References Cited

U.S. PATENT DOCUMENTS

| | | | |
|---|---|---|---|
| 2,403,731 A | | 7/1946 | MacNeille ................ 359/488 |
| 5,555,035 A | * | 9/1996 | Mead et al. .............. 348/757 |
| 5,626,410 A | | 5/1997 | Chambers et al. ........... 353/94 |
| 5,788,352 A | | 8/1998 | Montroy et al. ............ 353/30 |
| 5,902,030 A | | 5/1999 | Blanchard ................ 353/30 |
| 6,122,103 A | | 9/2000 | Perkins et al. ............ 359/486 |
| 6,262,696 B1 | | 7/2001 | Seraphim et al. ........... 345/1.3 |
| 6,513,938 B2 | | 2/2003 | Kubota et al. ............. 353/94 |
| 6,580,490 B1 | | 6/2003 | Wong et al. .............. 355/40 |
| 6,585,378 B2 | | 7/2003 | Kurtz et al. .............. 353/31 |
| 6,590,621 B1 | | 7/2003 | Creek et al. .............. 349/5 |
| 2002/0191235 A1 | * | 12/2002 | O'Connor et al. .......... 359/9 |
| 2003/0063226 A1 | * | 4/2003 | Gibbon et al. ............ 348/771 |

OTHER PUBLICATIONS

G. Starkweather; "DSHARP—A Wide Screen MultiProjector Display"; SID 03 Digest; pp. 1535–1537.
R. Raskar; "Immersive Planar Display using Roughly Aligned Projectors"; The Office of the Future Group, University of North Carolina at Chapel Hill.
R. Raskar, M. Brown, R. Yang, W. Chen, G. Welch, H. Towles, B. Seales, H. Fuchs; "Multi–Projector Displays Using Camera–Based Registration"; Department of Computer Science, University of North Carolina at Chapel Hill.

* cited by examiner

Primary Examiner—Judy Nguyen
Assistant Examiner—Rochelle Blackman
(74) Attorney, Agent, or Firm—Nelson Adrian Blish

(57) ABSTRACT

A projection apparatus (10) forms a tiled image (12) on a display surface (14), the tiled image (14) having at least two adjacent image tile segments. The projection apparatus (10) includes an illumination system (16) for providing a first illumination beam having a first polarization state and a second illumination beam having a second polarization state, these illumination beams being substantially non-overlapping. First and second spatial light modulators (20) form first and second modulated light beams from their respective illumination beams. A beam aligner (40) directs these first and second modulated light beams along adjacent parallel paths, in the direction of the optical axis of a projection lens (18). The projection lens (18) directs the first and second modulated beams to the display surface (14) to form the first and second tile segments respectively.

15 Claims, 6 Drawing Sheets

TILED PROJECTION DISPLAY USING SPATIAL LIGHT MODULATORS

FIELD OF THE INVENTION

This invention generally relates to projection imaging apparatus and more particularly relates to an apparatus and method for tiled projection display using spatial light modulators.

BACKGROUND OF THE INVENTION

There is a recognized need for wide-screen electronic displays in a number of fields, with typical uses ranging from desktop computer applications, to visualization and design software, to diagnostic imaging equipment, to still and motion picture entertainment systems and advertising displays, for example. In a recent paper entitled "DSHARP—A Wide Screen Multi-Projector Display" by Gary K. Starkweather in SID Digest 2003, potential advantages of wide-screen electronic displays for workstation environments are enumerated, including improved productivity and efficiency, minimized "household" chores for desktop organization, improved adaptability to the human visual system, and improved task comprehension.

With existing projection display systems, both film-based and electronic, images can be projected only at limited sizes and aspect ratios. These conventional display sizes are not sufficient to provide large-scale wide-screen display systems based on a single image-forming component. While there have been attempts to fabricate large-scale electronic spatial light modulators, exceeding conventional image frame sizes has proved difficult in practice. Instead, schemes for tiling multiple display systems have been adapted to overcome size and aspect ratio limitations.

Tiling solutions for conventional projection systems have been successfully implemented with various configurations. Tiling arrangements using conventional displays are disclosed in a number of publications, including the following:

"DottyToto: A Measurement Engine for Aligning Multi-projector Display Systems" by Mark Hereld, Ivan R. Judson, and Rick Stevens in Projection Displays IX, Proceedings of SPIE-IS&T Electronic Imaging, Ming H. Wu, editor;

"Immersive Planar Display Using Roughly Aligned Projectors" by Ramesh Raskar, The Office of the Future Group, University of North Carolina at Chapel Hill; and "Multi-Projector Displays Using Camera-Based Registration" by Ramesh Raskar et al., Department of Computer Science, University of North Carolina at Chapel Hill.

These and other display tiling solutions operate by attempting precision alignment between projected images from multiple projectors. However, this type of solution is hampered by effects such as slight movement of the display screen, jarring or movement of one or more projection apparatus, expansion due to heat, and imperfections due to projection optics, such as keystoning effects, for example. Moreover, slight color changes in adjacent tiled image sections become readily noticeable, detracting from the intended effect of projection image tiling. Among solutions proposed for tiling projection apparatus with minimal visibility of tile borders are those proposed in U.S. Pat. No. 6,590,621 (Creek et al.) and U.S. Pat. No. 6,513,938 (Kubota et al.).

Tiling has been used for spatial light modulators used in backlighting display applications. For example, U.S. Pat. No. 6,262,696 (Seraphim et al.) discloses a large display panel having a number of precisely aligned LCD display modules arranged as tiles over a backlighting surface; U.S. Pat. No. 5,626,410 (Chambers et al.) discloses tiling of LCD devices in a backlighting display using a fiber optic array for achieving more uniform brightness; U.S. Pat. No. 5,902,030 (Blanchard) discloses a backlighting system using multiple projectors, with a screen outfitted for suitably combining images, such as using Fresnel lens. While these approaches offer some solutions for backlighting systems that form an image on a specially designed, diffusive surface, the apparatus and techniques of these patents are not suitable for front-projection systems.

Tiling approaches have been proposed for printing applications. For example, commonly assigned U.S. Pat. No. 6,580,490 (Wong et al.) discloses the use of multiple tiled LCD spatial light modulators for providing exposure energy to a photosensitive medium over an enlarged two-dimensional area. However, print requirements vary significantly from projection requirements, requiring different solutions for uniformity, resolution, luminous flux, contrast, imaging artifacts, and other image characteristics.

There have been a number of proposed projection systems using multiple spatial light modulators and combining output beams, centered on a single optical axis for projection as a single output beam. For example, commonly-assigned U.S. Pat. No. 6,585,378 (Kurtz et al.) discloses a full-color projection system that employs a separate spatial light modulator in each color path, one each for red, green, and blue light modulation. Modulated light beams from these devices are then overlapped, typically using a polarization beam splitter, an x-cube, or other component as a beam combiner to provide the composite color image. Similarly, U.S. Pat. No. 5,788,352 (Montroy et al.) discloses the use of two LCD spatial light modulators to form overlapping images, providing increased luminance and resolution and improved response time. However, the arrangements disclosed in U.S. Pat. No. 6,585,378 and U.S. Pat. No. 5,788,352 are directed to overlapping of images formed on separate spatial light modulators rather than to tiling images adjacently to increase the size of the projected image.

Thus, it can be seen that tiling arrangements using multiple spatial light modulators have been adapted for a small number of backlit display and print imaging applications. However, projection display apparatus employing LCD spatial light modulators present some significant challenges to tiling implementation. For example, polarization states of incident illumination and modulated light must be accounted for in many types of projection apparatus using these devices. Projection optics must be suitable for projecting a tiled display, where tiles are adjacent, rather than overlapping as in the apparatus of U.S. Pat. No. 6,585,378 and U.S. Pat. No. 5,788,352.

SUMMARY OF THE INVENTION

It is an object of the present invention to provide a projection apparatus and method for forming a tiled display. With this object in mind, the present invention provides a projection apparatus for forming a tiled image on a display surface, the tiled image comprising at least a first image tile segment and an adjacent second image tile segment, the projection apparatus comprising:

(a) an illumination system providing a first illumination beam having a first polarization state and a second illumination beam having a second polarization state, the first and second illumination beams being parallel and substantially non-overlapping;

(b) a first spatial light modulator for forming a first modulated light beam from the first illumination beam;

(c) a second spatial light modulator for forming a second modulated light beam from the second illumination beam;

(d) a beam aligner for directing the first and second modulated light beams along adjacent parallel paths, in the direction of the optical axis of a projection lens; and projection lens directing the first modulated beam to the display surface to form the first tile segment and directing the second modulated beam to the display surface to form the second tile segment.

It is a feature of the present invention that it provides a light-combining mechanism that directs adjacent modulated image beams toward projection optics along parallel paths, allowing projection optics to project a tiled image having two or more adjacent tiles.

It is an advantage of the present invention that it obviates the need to align multiple projectors for obtaining a tiled output image. Instead, the apparatus of the present invention can be aligned for tiling at the time of manufacture.

It is a further advantage of the present invention that it allows a number of possible arrangements for illumination systems, including the use of the same illumination system for forming multiple tiled images. This helps to provide more uniform color from one tiled image to the next.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

In the description that follows, references to components may have part numbers with appended alphabetic characters, where it is useful to describe specific optical paths, as shown in the accompanying figures. Where the discussion refers to general characteristics of components, rather than to specific optical paths, appended alphabetic characters may be omitted.

First Embodiment

Figure 1:
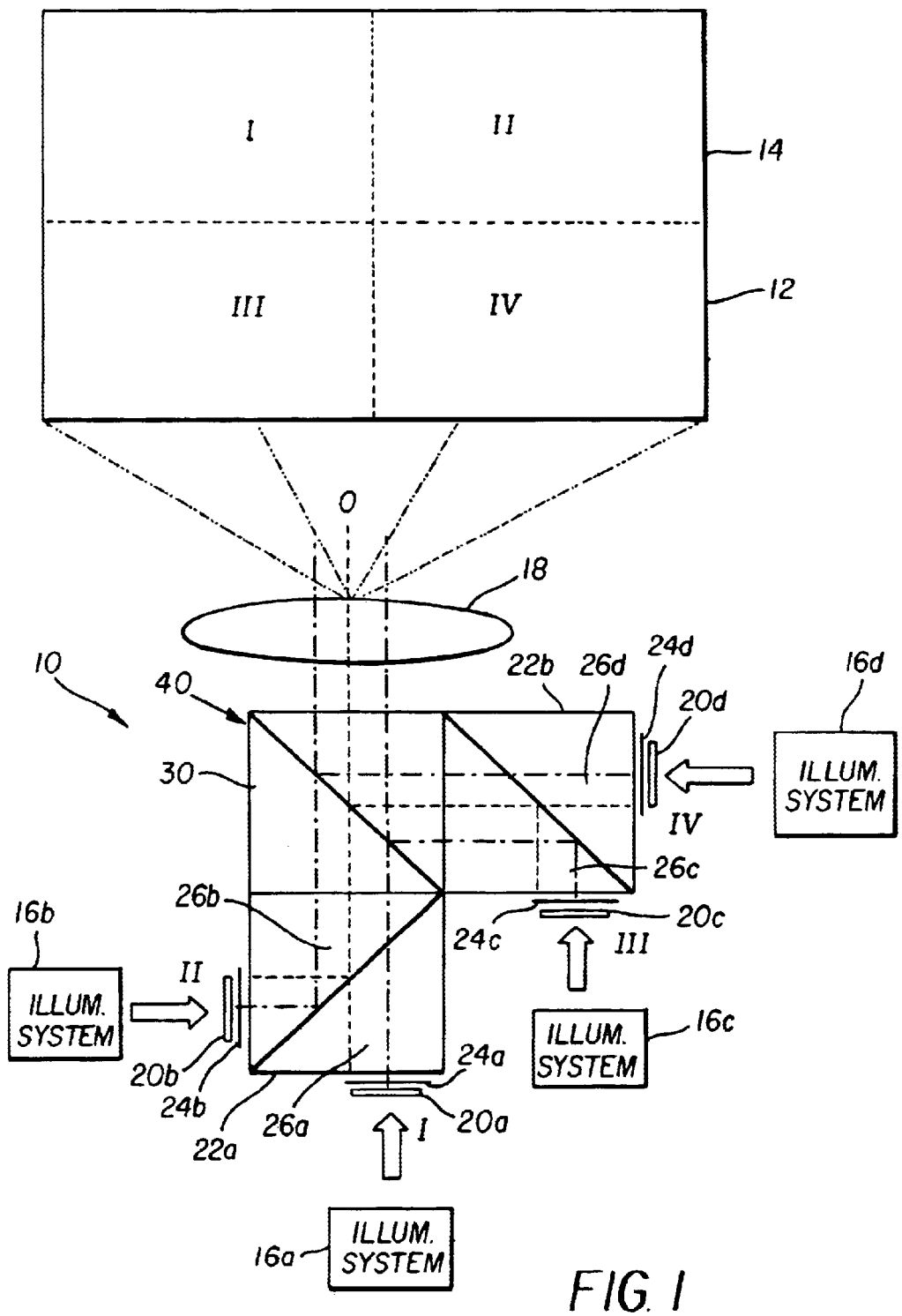
FIG. 1 is a schematic block diagram showing components of a projection apparatus for forming a tiled image on a display surface in a first embodiment of the present invention, using transmissive spatial light modulators.

Referring to FIG. 1, there is shown a projection apparatus 10 for forming a tiled image 12 on a display surface 14. A set of four spatial light modulators 20a, 20b, 20c, and 20d, transmissive liquid crystal devices (LCDs) in a preferred embodiment, is arranged to provide tiled image 12. Each spatial light modulator 20a–20d has a corresponding illumination system 16a, 16b, 16c, and 16d for providing source illumination. Possible configurations for illumination systems 16a–16d are given subsequently. The corresponding segment of tiled image 12 (with tiled segments arranged as four contiguous quadrants numbered I, II, III, and IV) is indicated for each spatial light modulator 20a–20d. An arrangement of polarization beamsplitters 22a and 22b with a beamsplitter 30 is provided as a beam aligner 40 for directing a corresponding modulated light beam 26a, 26b, 26c, and 26d from each spatial light modulator 20a, 20b, 20c, and 20d respectively, along a separate path parallel to optical axis O of a projection lens 18. Each spatial light modulator 20a–20d is provided with an analyzer 24a, 24b, 24c, and 24d for improved contrast. (Note that beamsplitter 30 is not a polarization beamsplitter where shown in embodiments disclosed herein.)

Figure 2:
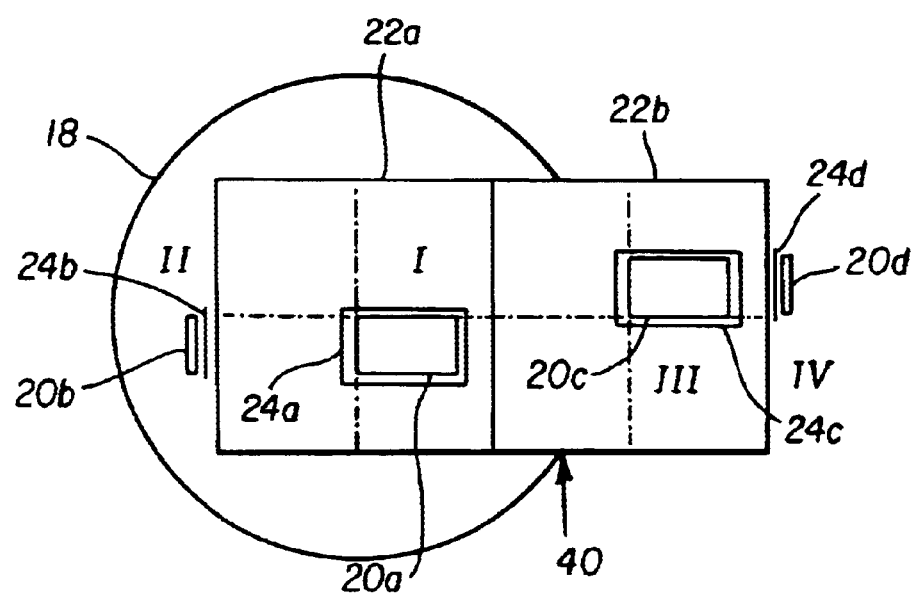
FIG. 2 is a plan view showing components of the projection apparatus of FIG. 1.

Projection lens 18 directs each modulated light beam to a separate tiled segment, as a corresponding one of quadrants I, II, III, or IV. These modulated light beams must be carefully aligned adjacently to minimize gaps, unintended overlaps, or skewing of tiled quadrants I–IV. FIG. 1 shows the relative positioning of spatial light modulators 20a–20d and their relative arrangement about beam aligner 40 components from a top view. FIG. 2 shows relative positions of spatial light modulators 20a–20d from a side view.

For an understanding of how projection apparatus 10 operates, it is instructive to follow the path of modulated light for each of the four tiled quadrants I–IV in FIG. 1, with reference also to the positioning of spatial light modulators 20a–20d from the side view of FIG. 2:

(i) Modulated light for quadrant I from illumination system 16a is modulated by spatial light modulator 20a to form modulated light beam 26a. Polarization beamsplitter 22a and beamsplitter 30 transmit modulated light beam 26a toward projection lens 18, on a path parallel to optical axis O, for forming tiled quadrant I.

(ii) Modulated light for quadrant II from illumination system 16b is modulated by spatial light modulator 20b to form modulated light beam 26b. Polarization beamsplitter 22a reflects modulated light beam 26b and beamsplitter 30 transmits modulated light beam 26b toward projection lens 18, on a path parallel to optical axis O, for forming tiled quadrant II.

(iii) Modulated light for quadrant III from illumination system 16c is modulated by spatial light modulator 20c to form modulated light beam 26c. Polarization beamsplitter 22b reflects modulated light beam 26c and beamsplitter 30 reflects modulated light beam 26c toward projection lens 18, on a path parallel to optical axis O, for forming tiled quadrant III.

(iv) Modulated light for quadrant IV from illumination system 16d is modulated by spatial light modulator 20d to form modulated light beam 26d. Polarization beamsplitter 22b transmits modulated light beam 26d and beamsplitter 30 reflects modulated light beam 26d toward projection lens 18, on a path parallel to optical axis O, for forming tiled quadrant IV.

Adjacent modulated light beams 26a, 26b, 26c, and 26d are directed toward projection lens 18 in parallel paths to output axis O. Unlike with prior art arrangements, modulated light beams 26a, 26b, 26c, and 26d are not centered onto the same optical axis by beam-combining elements. Instead, modulated light beams 26a, 26b, 26c, and 26d are directed adjacently, in a non-overlapping manner. Certainly, some slight overlap is unavoidable between any two adjacent modulated light beams 26a, 26b, 26c, and 26d, necessary for providing a suitable join or seam between adjacent image segments of tiled image 12. However, modulated light beams 26a, 26b, 26c, and 26d themselves are directed along separate, parallel axes rather than being centered onto the same optical axis O.

Analyzers 24a, 24b, 24c, and 24d are used in this embodiment to improve contrast for each tiled segment. Alternate arrangements for positioning analyzers 24a–24d are shown in subsequent embodiments.

Second Embodiment

Figure 3:
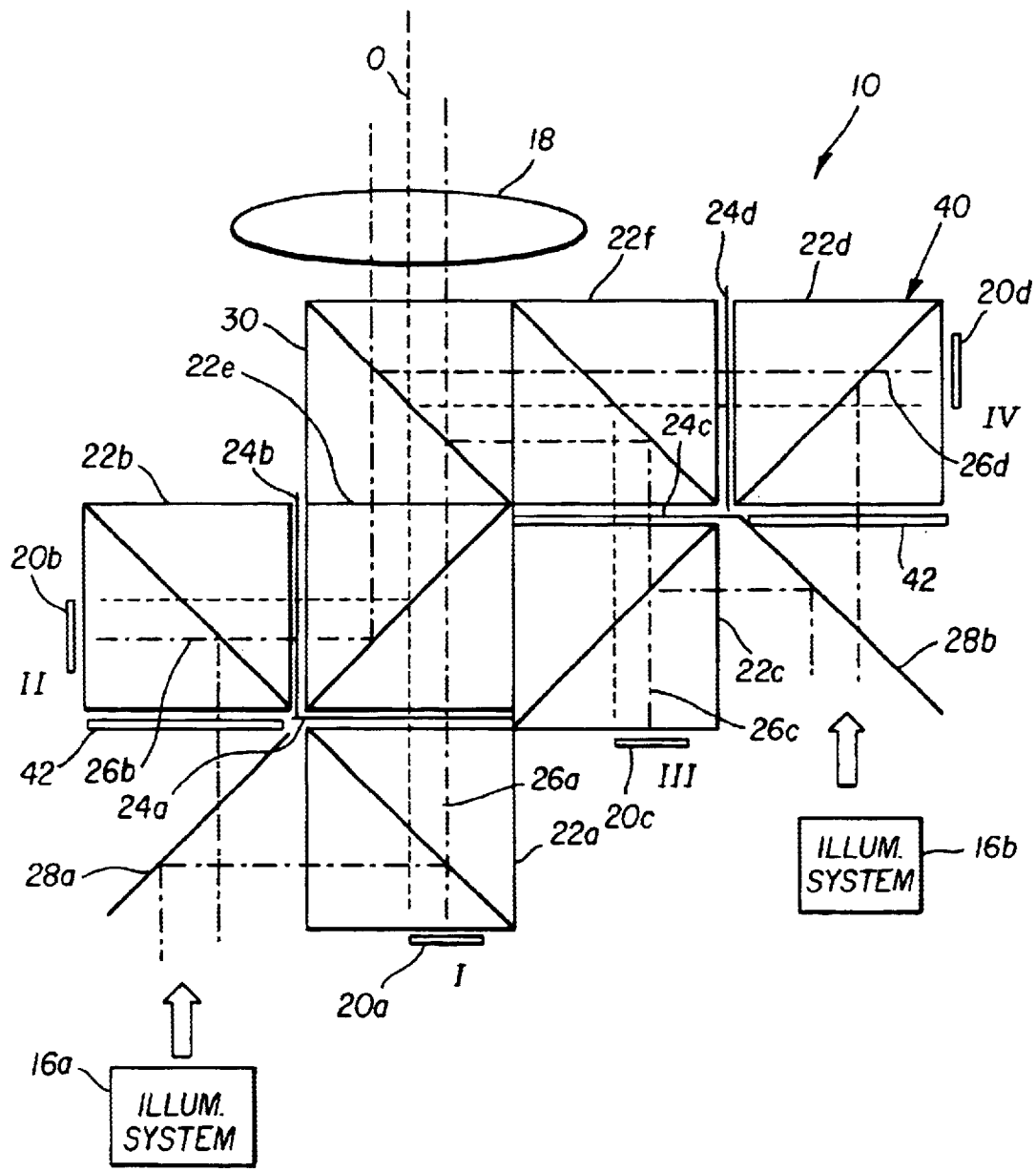
FIG. 3 is a schematic block diagram showing a projection apparatus for forming a tiled image in an alternate embodiment using reflective spatial light modulators.

Referring to FIG. 3, there is shown an alternate component arrangement for projection apparatus 10 in a second embodiment, using reflective spatial light modulators 20a–20d and using only two illumination systems 16a and 16b with beam aligner 40 for forming four quadrant tiled image 12 (not shown in FIG. 3, but similar to that shown in FIG. 1). For the beam-combining arrangement of FIG. 3, illumination systems 16a and 16b both provide polarized light along two parallel paths. Along one path, illumination system 16a provides S-polarized light; along the other parallel path, illumination system 16a provides P-polarized light. This light from illumination system 16a provides source illumination to a polarization beamsplitter 28a, a wire-grid polarization beamsplitter in one embodiment. Polarization beamsplitter 28a separates light by its polarization state, directing light of one polarization state to polarization beamsplitter 22a for modulation by reflective spatial light modulator 20a. Output modulated light beam 26a from spatial light modulator 20a is then transmitted through polarization beamsplitter 22a and an analyzer 24a and through polarization beamsplitter 22e and beamsplitter 30 to projection lens 18, in a path parallel to optical axis O, for forming tiled quadrant I. The other polarization state from polarization beamsplitter 28a goes through a half-wave plate 42 to alter its polarization state and is reflected toward reflective spatial light modulator 20b from polarization beamsplitter 22b. Output modulated light beam 26b is then transmitted through polarization beamsplitter 22b and an analyzer 24b, reflected by polarization beamsplitter 22e, and transmitted through beamsplitter 30, in a path parallel to optical axis O, toward projection lens 18 for forming tiled quadrant II.

Formation of tiled quadrants III and IV is similar. Polarization beam splitter 28b separates the polarized light along parallel paths from illumination system 16b by its polarization state, directing light of one polarization state to polarization beamsplitter 22c for modulation by reflective spatial light modulator 20c. Output modulated light beam 26c from spatial light modulator 20c is then transmitted through polarization beamsplitter 22c and through an analyzer 24c and is reflected by polarization beamsplitter 22f and beamsplitter 30, into a path parallel to optical axis O, to projection lens 18 for forming tiled quadrant III. The other polarization state from polarization beamsplitter 28b is transmitted through half-wave plate 42 to alter its polarization state, and toward reflective spatial light modulator 20d from polarization beamsplitter 22d. Output modulated light beam 26d is then transmitted through polarization beamsplitter 22d and an analyzer 24d and through polarization beamsplitter 22f, and is reflected by beamsplitter 30 into a path parallel to optical axis O, toward projection lens 18 for forming tiled quadrant IV.

Third Embodiment

Figure 4:
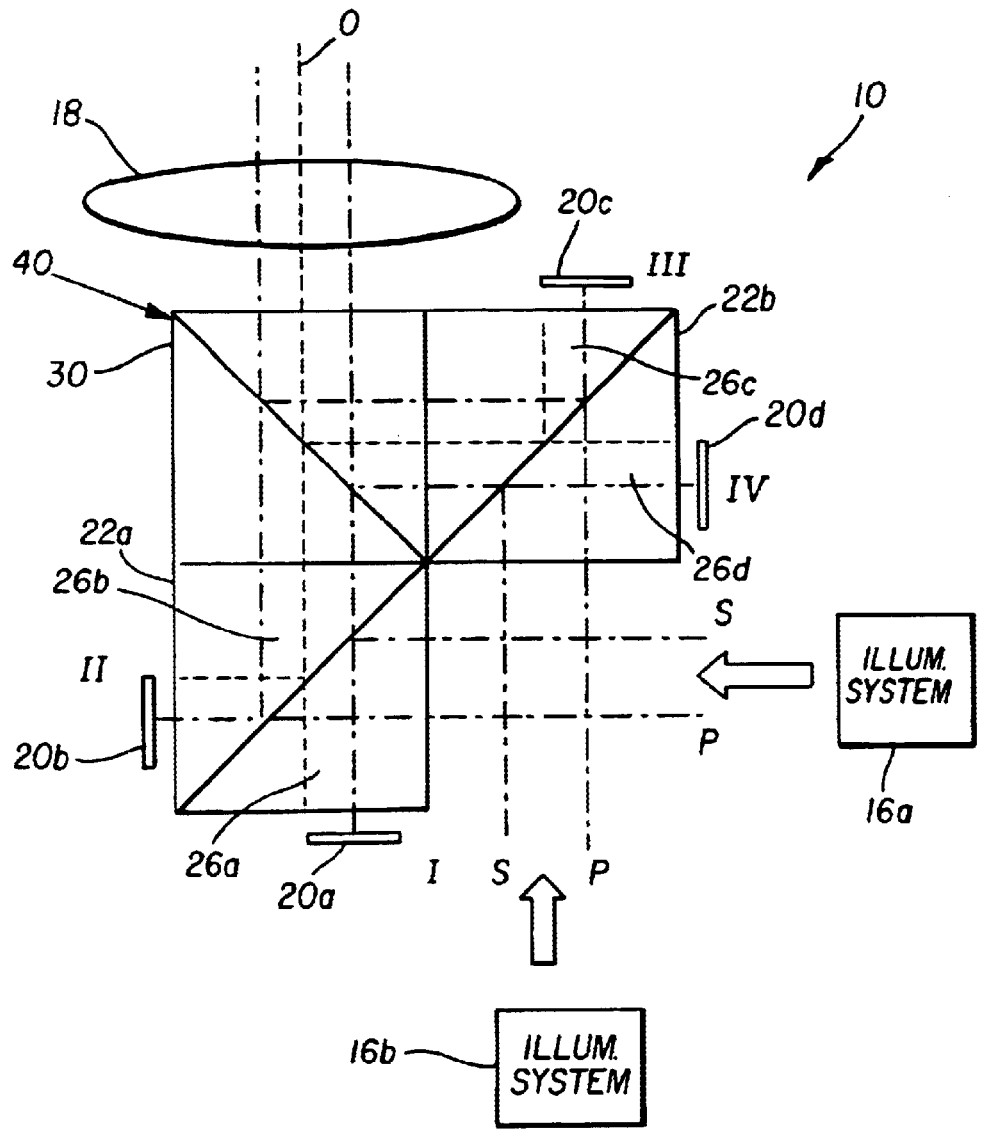
FIG. 4 is a schematic block diagram showing a projection apparatus for forming a tiled image in yet another alternate embodiment.

Referring to FIG. 4, there is shown a third embodiment of projection apparatus 10 of the present invention, using two separate illumination systems 16a and 16b that, in similar manner to the embodiment shown in FIG. 3, provide light having orthogonal polarization states in separate paths, indicated as paths S and P. Polarized illumination system 16a provides light of both polarization states to polarization beamsplitter 22a, which directs the received illumination into separate paths for each polarization state. In the example of FIG. 4, light having the S path polarization state is reflected toward reflective spatial light modulator 20a by polarization beamsplitter 22a. Light having the P path polarization state is transmitted toward spatial light modulator 20b. Modulated light beams 26a and 26b are then transmitted through beamsplitter 30, along adjacent paths parallel to optical axis O, toward lens 18 for forming tiled quadrants I and II respectively (as shown in FIG. 1). Similarly, polarization beamsplitter 22b directs the received P and S path polarized illumination from illumination system 16b into separate paths for spatial light modulators 20c and 20d respectively. Modulated light beams 26c and 26d are then directed by polarization beamsplitter 22b and reflected by beamsplitter 30, along adjacent paths parallel to optical axis O, toward projection lens 18 for forming tiled quadrants III and IV respectively (as shown in FIG. 1).

Fourth Embodiment

Figure 5:
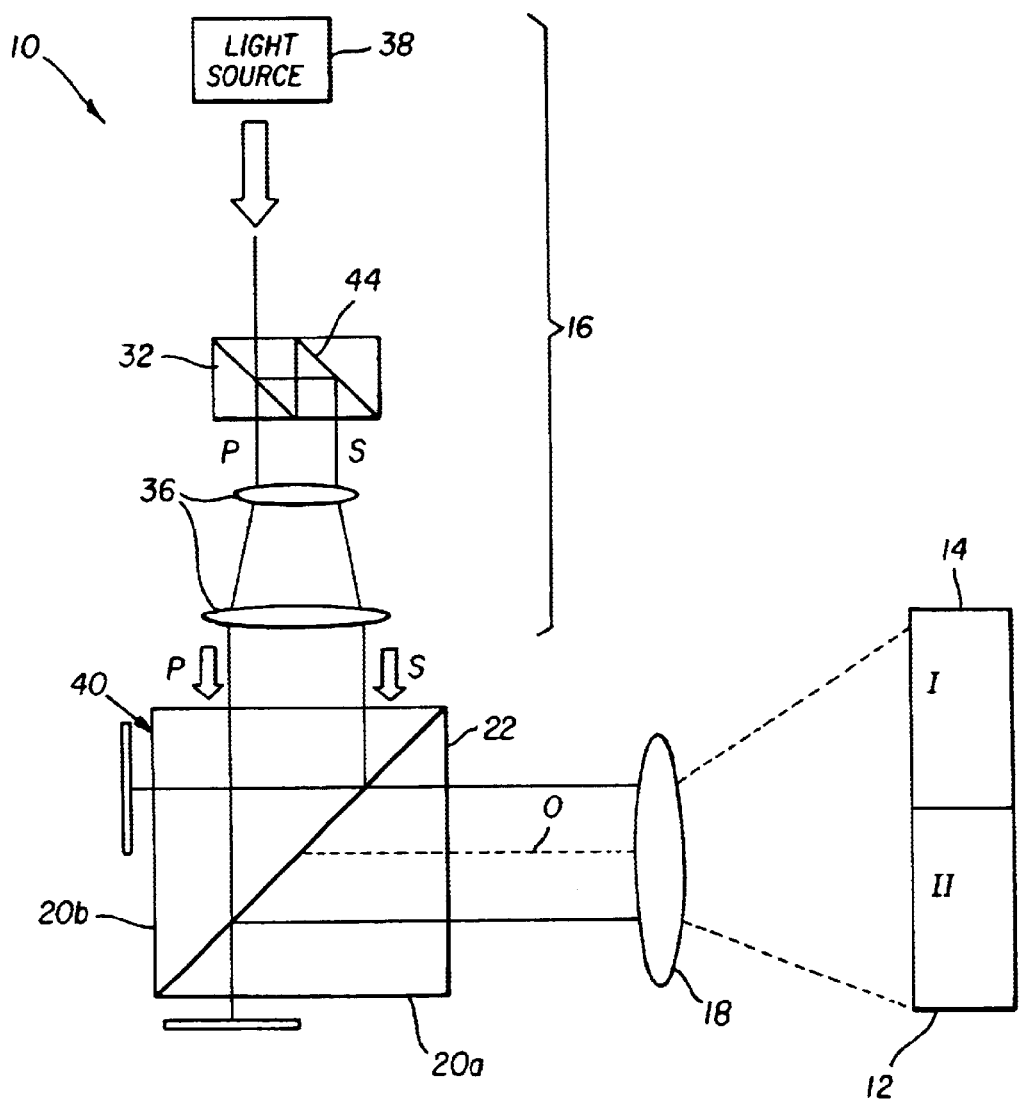
FIG. 5 is a schematic block diagram showing a projection apparatus for forming a tiled image in an alternate embodiment using two reflective spatial light modulators.

Referring to FIG. 5, there is shown an embodiment using two reflective spatial light modulators 20a and 20b for forming tiled image 12 having two tiled sections I and II. FIG. 5 also shows an arrangement of illumination system 16 that provides separate paths for S- and P-polarized light, as is needed for the alternative embodiments of FIGS. 3 and 4. A light source 38, such as a lamp or LED, for example, provides light to a polarization beamsplitter 32, typically through a uniformizer component of some kind, such as a lenslet array or integrator bar (not shown). Polarization beamsplitter 32 separates illumination into its orthogonal polarization states, and, using reflective surface 44 or a prism for redirecting light in the path of one of the polarization states, along spatially separate paths S and P. Lenses 36 direct this light toward a single polarization beamsplitter 22 which serves as beam aligner 40. Light having one polarization state is transmitted directly through polarization beamsplitter 32 along a path S for modulation by spatial light modulator 20a. Light having the orthogonal polarization state is reflected by polarization beamsplitter 22 for modulation by spatial light modulator 20b. Output modulated light is then directed from polarization beamsplitter 22 in the direction of optical axis O toward projection lens 18.

Fifth Embodiment

Figure 6:
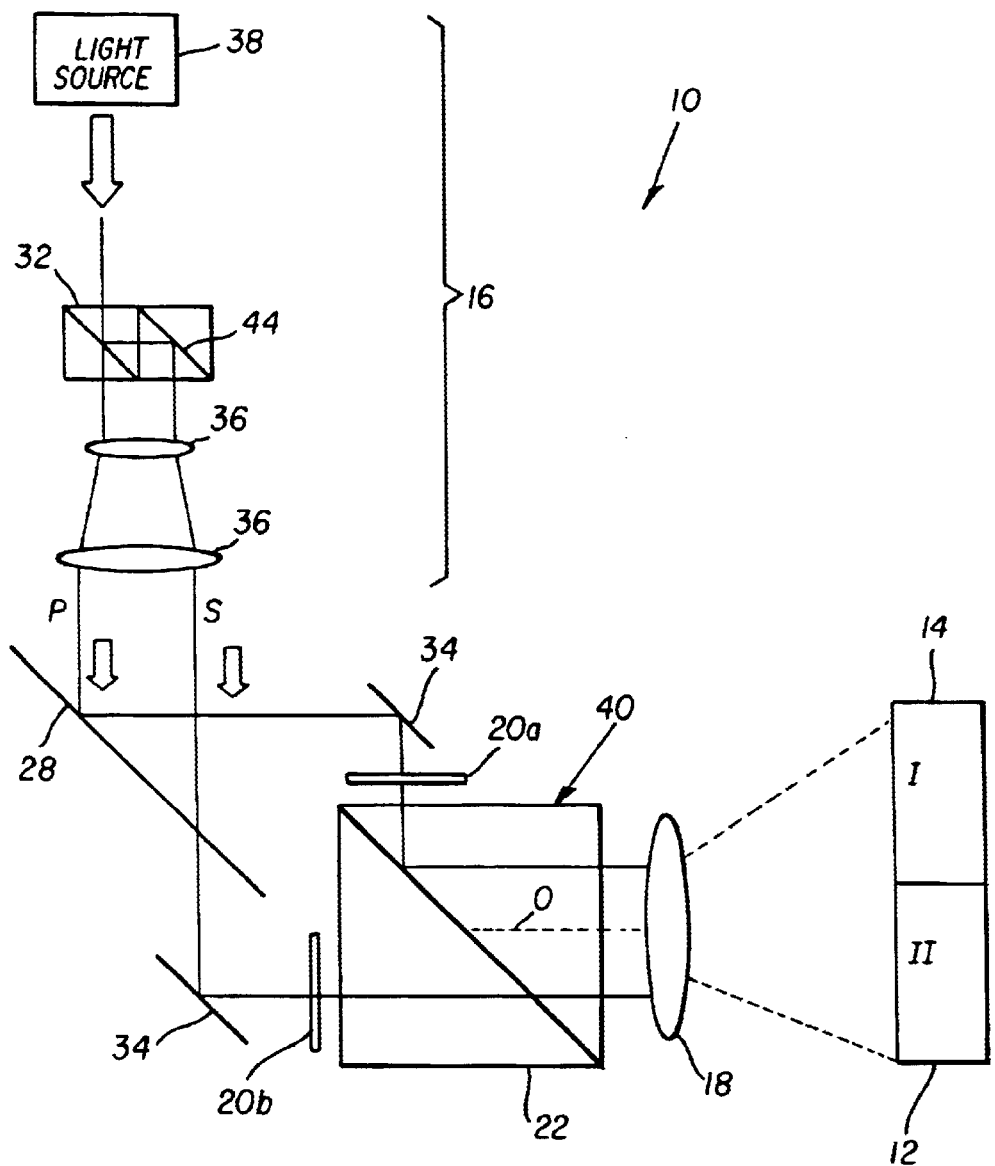
FIG. 6 is a schematic block diagram showing a projection apparatus for forming a tiled image in another alternate embodiment using two transmissive spatial light modulators.

Referring to FIG. 6, there is shown an alternate embodiment for projection using two transmissive spatial light modulators 20a and 20b for forming tiled image 12 having two tiled sections. As in the embodiment of FIG. 5, polarization beamsplitter 32 and reflective surface 44 are provided as part of illumination system 16 to separate the illumination into its orthogonal polarization states, along spatially separate paths, P and S. Polarization beamsplitter 28 directs one polarization state to transmissive spatial light modulator 20a, reflected by a turning mirror 34 in the embodiment of FIG. 6. Light having the orthogonal polarization state is directed through polarization beamsplitter 28 and to transmissive spatial light modulator 20b. Polarization beamsplitter 22, acting as beam aligner 40, then directs modulated light from both spatial light modulators 20a and 20b along adjacent paths, in the direction of optical axis O, toward projection lens 18.

The embodiments described hereinabove perform image tiling by alignment of modulated light beams 26a, 26b for forming adjacent image tiles, where this alignment is performed within the imaging subsystem of projection apparatus 10 itself, rather than requiring separate projection optics for each modulated light beam 26a, 26b, as with conventional tiling arrangements. Alignment of multiple spatial light modulators 20 need only be performed at the time of manufacture, thereby simplifying the setup and use of projection apparatus 10 when compared with conventional techniques for alignment of individual projectors to achieve tiling.

Projection lens 18 is a lens assembly that typically comprises a plurality of lens elements, rather than a single lens component as is represented in FIGS. 1, 3, and 4. Beam aligner 40, in the various embodiments of FIGS. 1–6, may use a number of alternative arrangements of beamsplitters 30 and/or polarization beamsplitters 22, 28. It is instructive to observe again that beam aligner 40 provides a separate path for modulated light from each spatial light modulator 20, with respective paths substantially non-overlapping.

Illumination system 16 may derive polarized light from a xenon lamp, an LED, or other suitable component for providing illumination. Alternately, illumination system 16 may direct light through an optical fiber or other light-guiding component. Methods for providing polarized light could employ polarization beamsplitter 32 in combination with reflective surface 44, as was shown in FIGS. 5 and 6, or other suitable components. The apparatus of the present invention could be employed for either monochrome or full-color imaging, using temporal sequencing of red, green, and blue light, each light provided separately to spatial light modulator 20, or some other method for providing a modulated color beam along the optical paths shown in FIGS. 1–6. Temporal sequencing could be provided using a color filter wheel or using other techniques well known in the electronic image projection arts.

In the simplest embodiment, using only two tiled image segments, beam aligner 40 is a single component, polarization beamsplitter 22 as shown in FIGS. 5 and 6. For more complex embodiments used for projecting three or more tiled image segments, beam aligner 40 is formed as a more complex arrangement of polarizing and conventional beamsplitters, with any number of suitable dichroic support elements, mirrors, and polarizing components, as shown in the embodiments of FIGS. 1, 3, and 4. It is instructive to note that the relative spatial positioning of spatial light modulators 20 is important, relative to the arrangement of beam aligner 40, for obtaining tiled image 12 with its separate tiled segments properly placed and aligned.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, suitable polarization states and polarization components in the imaging path would be chosen for compatibility and performance, using techniques well known in the imaging arts. Different types of polarization beamsplitters could be used as components of beam aligner 40, including conventional MacNeille polarization beamsplitters, as disclosed in U.S. Pat. No. 2,403,731, (MacNeille) and wire-grid polarization beamsplitters, as disclosed in U.S. Pat. No. 6,122,103 (Perkins et al.), for example.

Thus, what is provided is an apparatus and method for tiled projection display using spatial light modulators.

PARTS LIST

10 projection apparatus
12 tiled image
14 display surface
16 illumination system
16a illumination system
16b illumination system
16c illumination system
16d illumination system
18 projection lens
20 spatial light modulator
20a spatial light modulator
20b spatial light modulator
20c spatial light modulator
20d spatial light modulator
22 polarization beamsplitter
22a polarization beamsplitter
22b polarization beamsplitter
22c polarization beamsplitter
22d polarization beamsplitter
22e polarization beam splitter
22f polarization beamsplitter
24a analyzer
24b analyzer
24c analyzer
24d analyzer
26a modulated light beam
26b modulated light beam
26c modulated light beam
26d modulated light beam
28 polarization beamsplitter
28a polarization beamsplitter
28b polarization beamsplitter
30 beamsplitter
32 polarization beamsplitter
34 mirror
36 lens
38 light source
40 beam aligner
42 half-wave plate
44 reflective surface

What is claimed is:

1. A projection apparatus for forming a tiled image on a display surface, said tiled image comprising at least a first, second, third, and fourth image tile segments the projection apparatus comprising:

(a) an illumination system providing a first illumination beam having a first polarization state and a second illumination beam having a second polarization state, said first and second illumination beams being spatially separated;

(b) a first spatial light modulator for forming a first modulated light beam from said first illumination beam;

(c) a second spatial light modulator for forming a second modulated light beam from said second illumination beam;

(d) a first beam aligner for directing said first and second modulated light beams along adjacent parallel paths, the first and second modulated light beams being substantially non-overlapping and parallel to an optical axis of a projection lens;

(e) said illumination system providing a third illumination beam having a first polarization state and a fourth illumination beam having a second polarization state said third and fourth illumination beams being spatially separated;

(f) a third spatial light modulator for forming a third modulated light beam from said third illumination beam;

(g) a fourth spatial light modulator for forming a fourth modulated light beam from said fourth illumination beam;

(h) a second beam aligner for directing said third and fourth modulated light beams along adjacent parallel paths, the third and fourth modulated light beams being substantially non-overlapping;

(i) a beamsplitter which redirects said third and fourth modulated light beams parallel to said optical axis of said projection lens and transmits said first and second modulated light beams; and said projection lens directing said first, second, third, and fourth modulated beams to said display surface to form the first, second, third, and fourth tile segments.

2. A projection apparatus according to claim 1 wherein said first beam aligner comprises a polarization beamsplitter.

3. A projection apparatus according to claim 1 wherein said first spatial light modulator is a transmissive LCD.

4. A projection apparatus according to claim 1 wherein said first spatial light modulator is a reflective LCD.

5. A projection apparatus according to claim 1 further comprising an analyzer in the path of said first modulated beam.

6. A projection apparatus according to claim 1 wherein said illumination system comprises a polarization beamsplitter.

7. A projection apparatus according to claim 1 wherein said illumination system comprises a light source selected from the group consisting of a lamp and an LED.

8. A projection apparatus according to claim 1 wherein said illumination system sequentially provides light having a first color, followed by light having a second color, followed by light having a third color.

9. A projection apparatus according to claim 1 further comprising a half-wave plate in the path of said first modulated beam.

10. A projection apparatus for forming a tiled image on a display surface, said tiled image comprising at least four contiguous image tile segments, the projection apparatus comprising:

(a) an illumination system providing a first illumination beam having a first polarization state and a second illumination beam having a second polarization state, said first and second illumination beams being spatially separated;

(b) a first spatial light modulator for forming a first modulated light beam from said first illumination beam;

(c) a second spatial light modulator for forming a second modulated light beam from said first illumination beam;

(d) a third spatial light modulator for forming a third modulated light beam from said second illumination beam;

(e) a fourth spatial light modulator for forming a fourth modulated light beam from said second illumination beam;

(f) a beam aligner for directing said first, second, third, and fourth modulated light beams along adjacent parallel paths, in the direction of the optical axis of a projection lens, said first, second, third, and fourth modulated light beams being substantially non-overlapping; and (g) said projection lens directing each said modulated beam to the display surface to form each of said at least four contiguous image tile segments.

11. A method for forming a tiled image on a display surface, said tiled image comprising at least a first, second, third, and fourth image tile segments, the method comprising:

(a) providing a first illumination beam having a first polarization state and a second illumination beam having the orthogonal polarization state, wherein the first and second illumination beams are spatially separated;

(b) forming a first modulated light beam from said first illumination beam;

(c) forming a second modulated light beam from said second illumination beam;

(d) aligning said first and second modulated light beams along separate, adjacent parallel paths, in the direction of the optical axis of a projection lens;

(e) providing a third illumination beam having a first polarization state and a fourth illumination beam having the orthogonal polarization state, wherein the third and fourth illumination beams are spatially separated;

(f) forming a third modulated light beam from said third illumination beam;

(g) forming a fourth modulated light beam from said fourth illumination beam;

(h) aligning said third and fourth modulated light beams along separate, adjacent parallel paths;

(i) redirecting said third and fourth modulated light beams parallel to the optical axis of the projection lens; and (j) projecting at least said first, second, third, and fourth modulated beams to said display surface, in a substantially non-overlapping manner, to form the first, second, third, and fourth tile segments.

12. A method for forming a tiled image according to claim 11 wherein the step of forming said first modulated light beam comprises the step of directing said first illumination beam to a reflective spatial light modulator.

13. A method for forming a tiled image according to claim 11 wherein the step of forming said first modulated light beam comprises the step of directing said first illumination beam to a transmissive spatial light modulator.

14. A method for forming a tiled image according to claim 11 wherein the step of providing said first illumination beam comprises the step of providing a beam having a repeating sequence of different colors.

15. A projection apparatus for forming a tiled image on a display surface, said tiled image comprising at least a first, second, third, and fourth image tile segments, the projection apparatus comprising:

(a) an illumination system providing a first illumination beam having a first polarization state and a second illumination beam having an orthogonal polarization state, said first and second illumination beams being spatially separated;

(b) a projection lens having a projection lens optical axis;

(c) a first beam aligner for receiving a first modulated light beam from a first spatial light modulator disposed at a first position, for receiving a second modulated light beam from a second spatial light modulator disposed at a second position and for directing the first modulated light beam and second modulated light beams in parallel to said projection lens optical axis, said first and second modulated light beams being substantially non-overlapping;

(d) wherein the illumination system further provides a third illumination beam having said first polarization state and a fourth illumination beam having said orthogonal polarization state, said third and fourth illumination beams being spatially separated;

(e) a second beam aligner for receiving said third modulated light beam from a third spatial light modulator disposed at a third position, for receiving said fourth modulated light beam from a fourth spatial light modulator disposed at a fourth position and for directing the third modulated light beam and fourth modulated light beams in parallel with respect to each other and substantially perpendicular to said projection lens optical axis, said third and fourth modulated light beams being substantially non-overlapping; and (f) a beamsplitter for transmitting said first and second modulated light beams parallel to said projection lens optical axis and for redirecting said third and fourth modulated light beams parallel to said projection lens optical axis, thereby directing said first, second, third, and fourth modulated light beams in parallel to said projection lens optical axis and wherein said first, second, third, and fourth modulated light beams are substantially non-overlapping.

* * * * *